June 18, 1935.  J. N. BLUE  2,004,921
BOX AND BEARING FOR RAILWAY VEHICLES
Filed Aug. 22, 1933   3 Sheets-Sheet 1
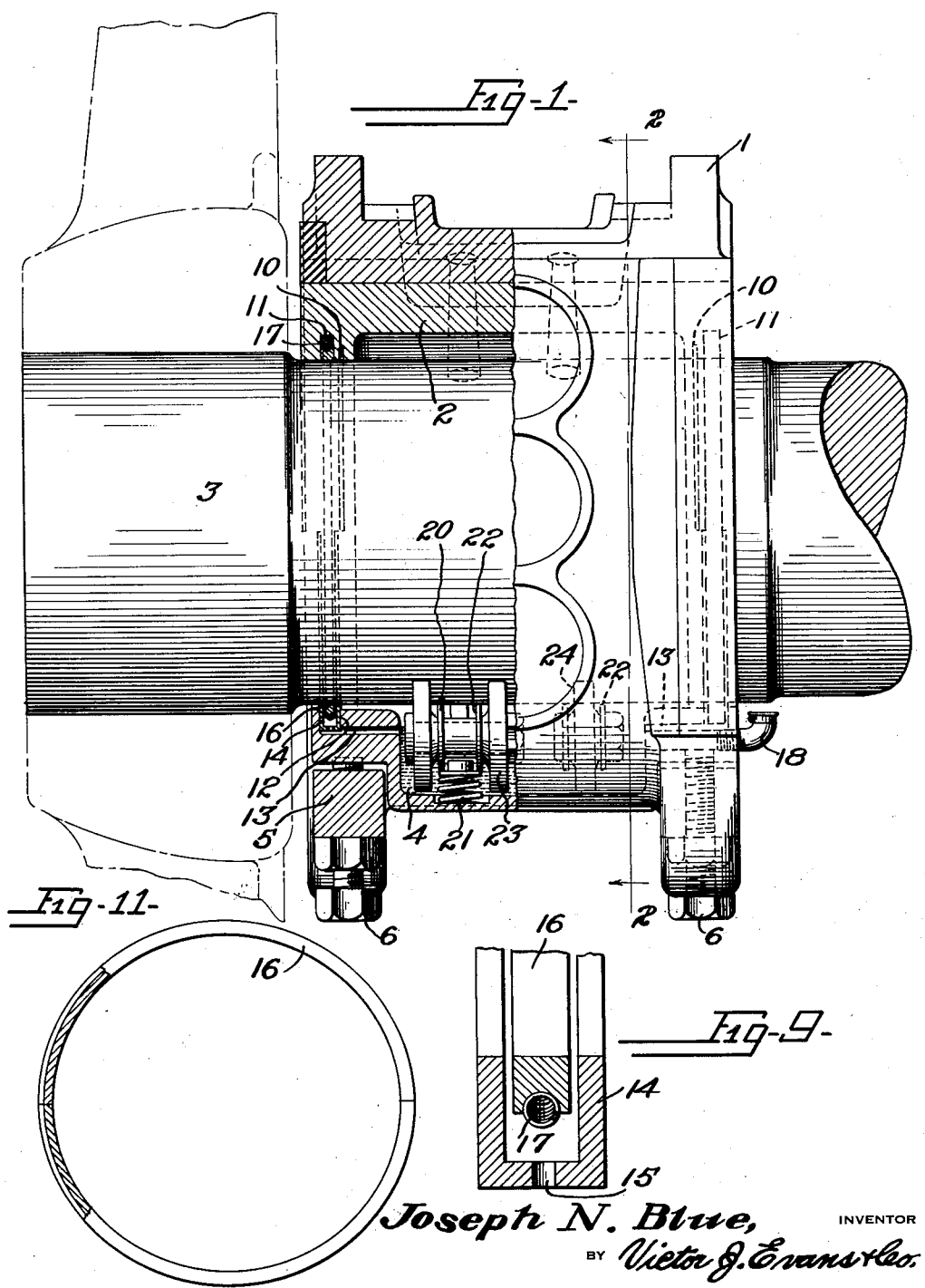
Joseph N. Blue, INVENTOR
BY Victor J. Evans & Co.
ATTORNEY
WITNESS:

June 18, 1935.  J. N. BLUE  2,004,921
BOX AND BEARING FOR RAILWAY VEHICLES
Filed Aug. 22, 1933    3 Sheets-Sheet 2
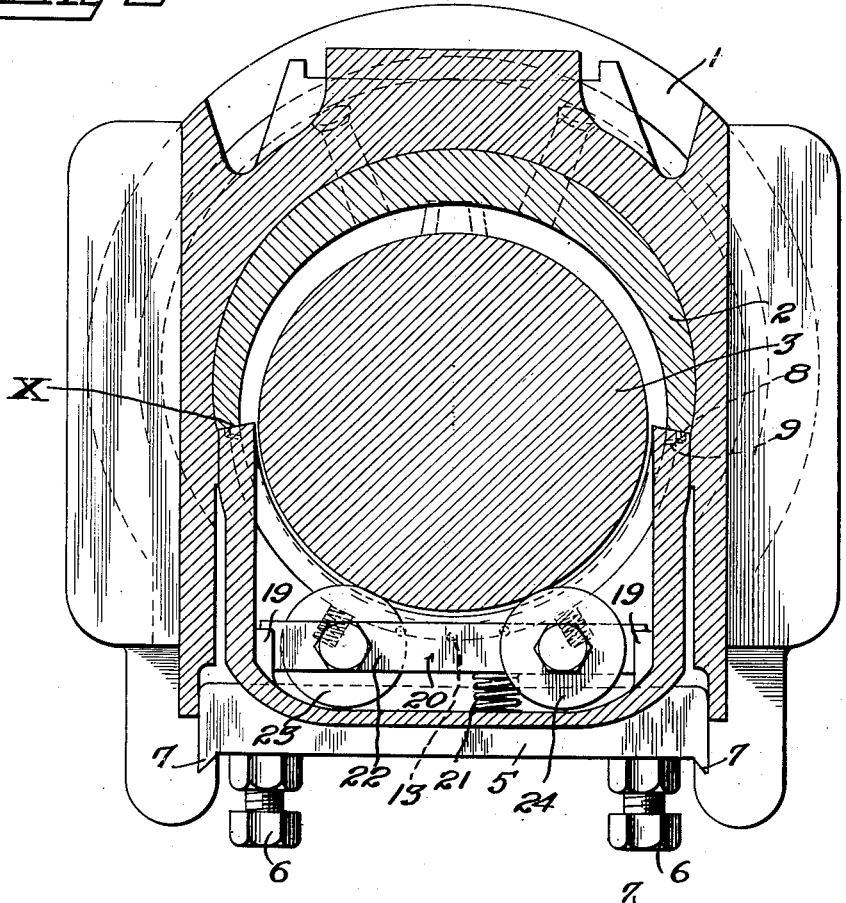
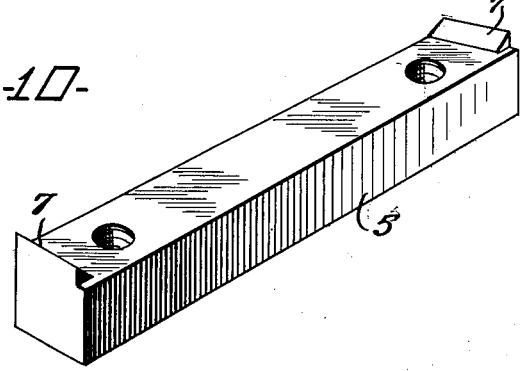
Joseph N. Blue,
INVENTOR

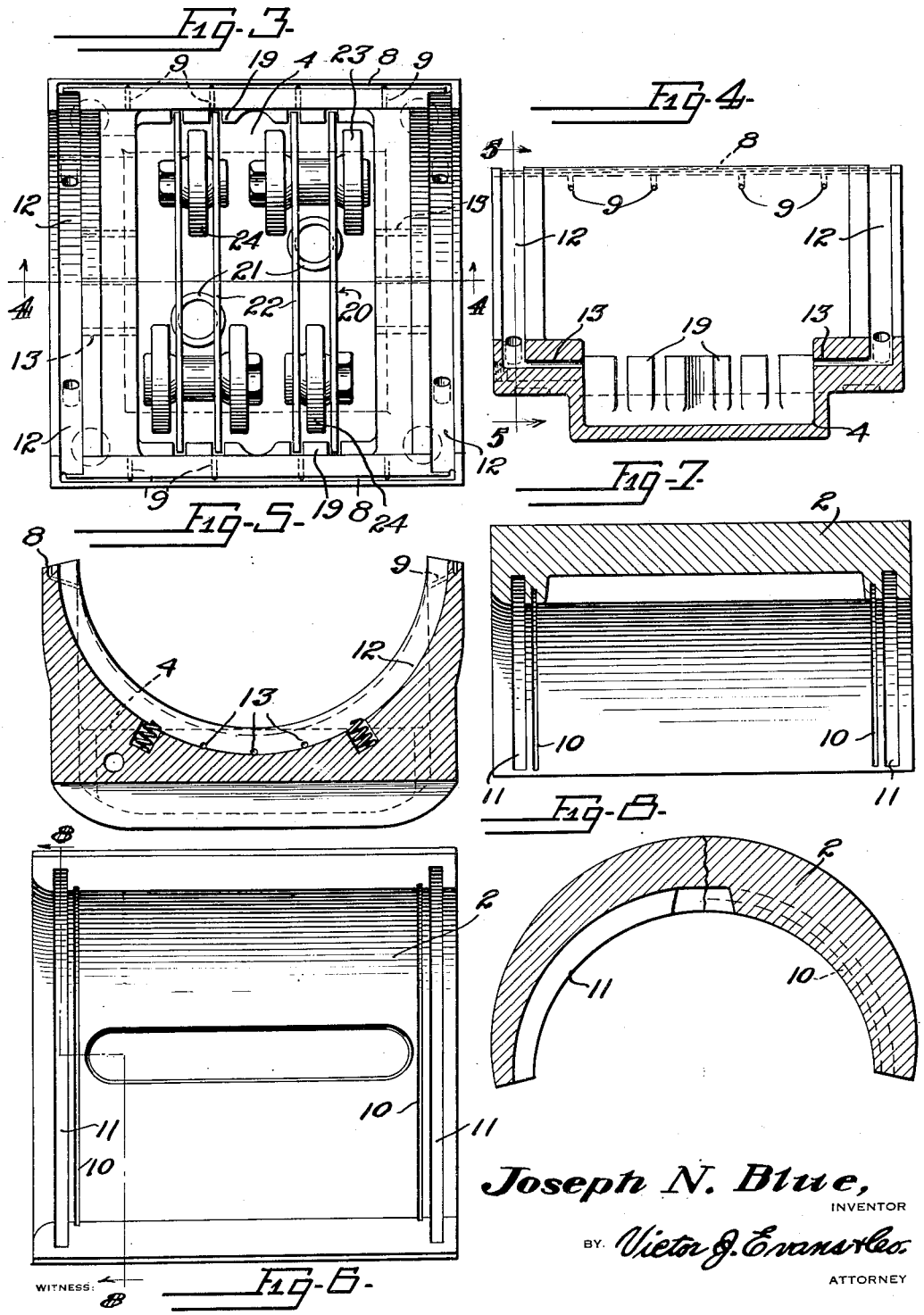

Patented June 18, 1935

2,004,921

UNITED STATES PATENT OFFICE 2,004,921

BOX AND BEARING FOR RAILWAY VEHICLES

Joseph Norton Blue, Big Spring, Tex.

Application August 22, 1933, Serial No. 686,277

1 Claim. (Cl. 308—80)

This invention relates to boxes and bearings for railway vehicles, being an improvement on the device set forth in my U. S. Letters Patent No. 1,869,795, granted August 2, 1932 and has for the primary object the provision of an improved means for delivering lubricant from the reservoir to the axle and bearing therefor and which will be positive in action to assure thorough lubrication of said parts and will be simple and compact in construction and may be easily and quickly installed without undue expense or alteration of parts.

Another object of the invention is the provision of improved packing and mountings therefor to prevent escape of lubricant endwise of the axle and its bearing and from the ends of the lubricant reservoir and which also assures the return of the lubricant to the reservoir after distribution to the axle and its bearing.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a box and bearing for a railway vehicle constructed in accordance with the present invention.

Figure 2 is a transverse sectional view taken on the line 2—2 of Figure 1.

Figure 3 is a plan view illustrating the lubricant reservoir carrying the lubricant applying means.

Figure 4 is a sectional view taken on the line 4—4 of Figure 3.

Figure 5 is a sectional view taken on the line 5—5 of Figure 4.

Figure 6 is a plan view illustrating the bearing.

Figure 7 is a vertical sectional view illustrating the same.

Figure 8 is a sectional view taken on the line 8—8 of Figure 6.

Figure 9 is a fragmentary sectional view illustrating the lubricant retaining ring and its mounting or housing that contacts the circular periphery of the lower half of the axle in one or more sections.

Figure 10 is a perspective view illustrating the supporting medium for the lubricant reservoir.

Figure 11 is a side elevation, partly in section, illustrating the lubricant retaining ring.

Referring in detail to the drawings, the numeral 1 indicates a driving box for a railway vehicle carrying a bearing 2 in which is journaled an axle 3 of the vehicle. The bearing is arranged in the upper half of the box and the lower end of the latter is closed by a lubricant reservoir 4 retained in position by supporting elements 5 detachably secured to the box by fasteners 6. The supporting elements as shown are provided with tapered projections 7 fitted in corresponding grooves formed in the walls of the box but may be located or anchored on the lugs of the box by the use of studs or other means if necessary to effect additional clearance if needed and not vary from the principles of the structure.

The lubricant reservoir 4 is shaped to receive approximately one-half the diameter of the axle and the longitudinal end faces are provided with oil grooves 8, which communicate with ducts 9 leading to the oil reservoir for the purpose of preventing the escape of lubricant between the longitudinal running joint of the oil reservoir 4 and bearing 2 denoted at X, Figure 2. Some of the lubricant grooves heretofore referred to upon the surface of the bearing are indicated by the character 10 and it is to be noted that these grooves are arranged adjacent the edge of the bearing and also adjacent packing grooves 11, which collect and deposit the major portion of the oil leaking in an endwise direction in the reservoir before coming in contact with oil retaining ring 16. The packing grooves 11 communicate with grooves 12 in the end walls of the reservoir and are in communication with ducts 13 leading to the lubricant sump of the reservoir.

Mounted in the grooves 12 are packing ring housings 14, one wall of which provides drain openings 15 to permit lubricant caught by the housing to pass into the ducts 13 for return to the sump of the reservoir. Sectional packing rings 16 are mounted in the housings 14 and the grooves 11 and snugly fit the axle 3. The peripheries of the rings are grooved to receive garter type springs 17 urging the rings to engage and conform to the contour of the axle. Packing ring housings 14 are slidably fitted in grooves 12 of lubricant reservoir 4 and are held in engagement with the axle by springs as noted in Figure 5, sealing the bottom half of axle circumferentially against oil leakage. As it will be seen from the drawings the packing ring 16 is snugly and slidably fitted to the axle which will permit free and unobstructed lateral movement of the boxing 1 on axle 3 when in excess of the limited amount provided for in the housings 14 and grooves 11 in bearing 2, which is common to railway vehicles. The rings 16 prevent the escape of the lubricant from the ends of the driving box and provide means for collecting lubricant from the axle in the bearing and directing such lubricant back to the reservoir. The reservoir is equipped with a suitable medium 18 whereby lubricant may be readily placed in the reservoir.

Opposite walls of the reservoir are provided with guides 19 to slidably support lubricant applying means 20. The means 20 is partially submerged in the sump of the reservoir and also contacts with the axle 3 to apply lubricant from the reservoir to the axle during the rotation of the latter. Each lubricant applying means is yieldably supported in engagement with the axle by springs 21 and consists of a frame 22 including spaced members operating in the guides and having journaled thereto rollers 23 and 24 of the anti-friction type. The rollers are mounted on axles carried by the spaced members. The roller 24 is arranged to contact with the axle between the contacts of the rollers 23 of said axle. Thus it will be seen that an even film of lubricant will be delivered from the reservoir to the face of the axle.

While the lubricant applying means 20 has been described as operating in conjunction with the structure set forth in my patent it is to be understood said means can be easily installed in other types of journal boxes without undue alteration.

While I have shown and described the preferred embodiment of my invention, it will be understood that minor changes in construction, combination and arrangement of parts may be made without departing from the spirit and scope of my invention, as claimed.

Having described the invention, I claim:

A journal for railway vehicles comprising a box to receive therein an axle and having semi-circular packing grooves each arranged adjacent an end of the box and located in the lower half of said box, a bearing in the upper half of the box and engaging the axle and having semi-circular packing grooves aligning with and communicating with said first packing grooves, annular packing housings mounted in said grooves about the axle and having channels in the inner peripheries thereof and provided with lubricant drain openings extending through the outer peripheries to communicate the channels with the packing grooves and the latter being in communication with the lower half of the box, sectional packing rings mounted in the channels of the housing and having spring grooves in their outer peripheries, and coiled springs encircling the rings and resting in the spring grooves to urge the rings against the axle to prevent escape of lubricant from the box in an endwise direction of the axle.

JOSEPH N. BLUE.